US005701373A

United States Patent [19]
Oleskevich

[11] Patent Number: 5,701,373
[45] Date of Patent: Dec. 23, 1997

[54] METHOD FOR IMPROVING THE COUPLING EFFICIENCY OF ELLIPTICAL LIGHT BEAMS INTO OPTICAL WAVEGUIDES

[75] Inventor: Tanya Oleskevich, Victoria, Canada

[73] Assignee: SDL, Inc., San Jose, Calif.

[21] Appl. No.: 542,017

[22] Filed: Oct. 12, 1995

[51] Int. Cl.$^6$ .................................................. G02B 6/32
[52] U.S. Cl. ........................................................ 385/33
[58] Field of Search ................................ 385/33, 43, 49; 219/121.69, 121.66

[56] References Cited

U.S. PATENT DOCUMENTS

| | | | |
|---|---|---|---|
| 3,628,294 | 12/1971 | Sattler et al. | 51/283 |
| 3,932,184 | 1/1976 | Cohen et al. | 156/15 |
| 5,011,254 | 4/1991 | Edwards et al. | 350/96.18 |
| 5,256,851 | 10/1993 | Presby | 219/121.69 |
| 5,377,287 | 12/1994 | Lee et al. | 385/35 |

FOREIGN PATENT DOCUMENTS

| | | |
|---|---|---|
| A2424685 | 11/1979 | France . |
| 150810 | 9/1982 | Japan . |
| 57-150810 | 9/1982 | Japan . |
| 60-153010 | 8/1985 | Japan . |
| A1435523 | 5/1976 | United Kingdom . |

OTHER PUBLICATIONS

Barnard, Chris W., et al., Mode Transforming Properties Of Tapered Single–Mode Fiber Microlenses, Applied Optics, vol. 32, No. 12, Apr. 20, 1993.

Eisenstein, G., et al., Chemically Etched Conical Microlenses For Coupling Single–Mode Lasers Into Single–Mode Fibers, Applied Optics, vol. 21, No. 19 Oct. 1982.

Kuwahara, H., et al., Efficient Coupling From Semiconductor Lasers Into Single–Mode Fibers With Tapered Hemispherical Ends, Applied Optics, vol. 19, No. 15, Aug. 1, 1980.

Lee, Kyung S., et al., Microlenses On The End Of Single–Mode Optical Fibers For Laser Applications, Applied Optics, vol. 24, No. 19, Oct. 1, 1985.

Shah, Virendra S., Efficient Power Coupling From A 980–NM, Broad–Area Laser To A Single–Mode Fiber Using A Wedge–Shaped Fiber Endface, Journal of Lighwave Technology, vol. 8, No. 9, Sep., 1990.

Cohen et al., entitled "Microlenses for Coupling Junction Laser to Optical Fibers" Applied Optics, (Jan. 1, 1974), vol. 24, No. 1, pp. 89–94.

E. Weidel, entitled "Light Coupling From a Junction Laser into a Monomode Fibre with a Glass Cylindrical lens on the Fibre End", Optics Communications, (Sep. 1, 1974), vol. 12, No. 1, pp. 93–97.

Lee et al., entitled "Microlenses on the End of a Single–modeOptical Fibers for Laser Application" Applied Optics, (Oct. 1, 1985), vol. 24, No. 19, pp. 3134–3139.

Krumpholz et al., entitled "Power Coupling Between Monomode and Semiconductor Lasers with Strong Astigmatism" 7th European Conference on Optical Communication, (Nov. 8, 1981), pp. 7, 7–1–7.7–4, XP00202252.

Ayunts et al., entitled "Coupling of Optical Radiation into Fiber Waveguides of Elliptic Cross Section", Soviet Journal of Quantum Electronics, (Nov. 12, 1983,) vol. 13, No. 12, pp. 1584–1590.

*Primary Examiner*—Akm E. Ullah
*Attorney, Agent, or Firm*—W. Douglas Carothers, Jr.

[57] ABSTRACT

An optical coupling system for improving the coupling efficiency of an elliptical light beam into optical fiber comprises a cylindrical concave microlens on the end facet of the optical fiber in conjunction with a pair of bulk optic asphere lenses. A method of producing a cylindrical concave microlens according to the invention consists of translating a fine wire across the end facet of an optical fiber so as to create a cylindrical grove.

56 Claims, 2 Drawing Sheets

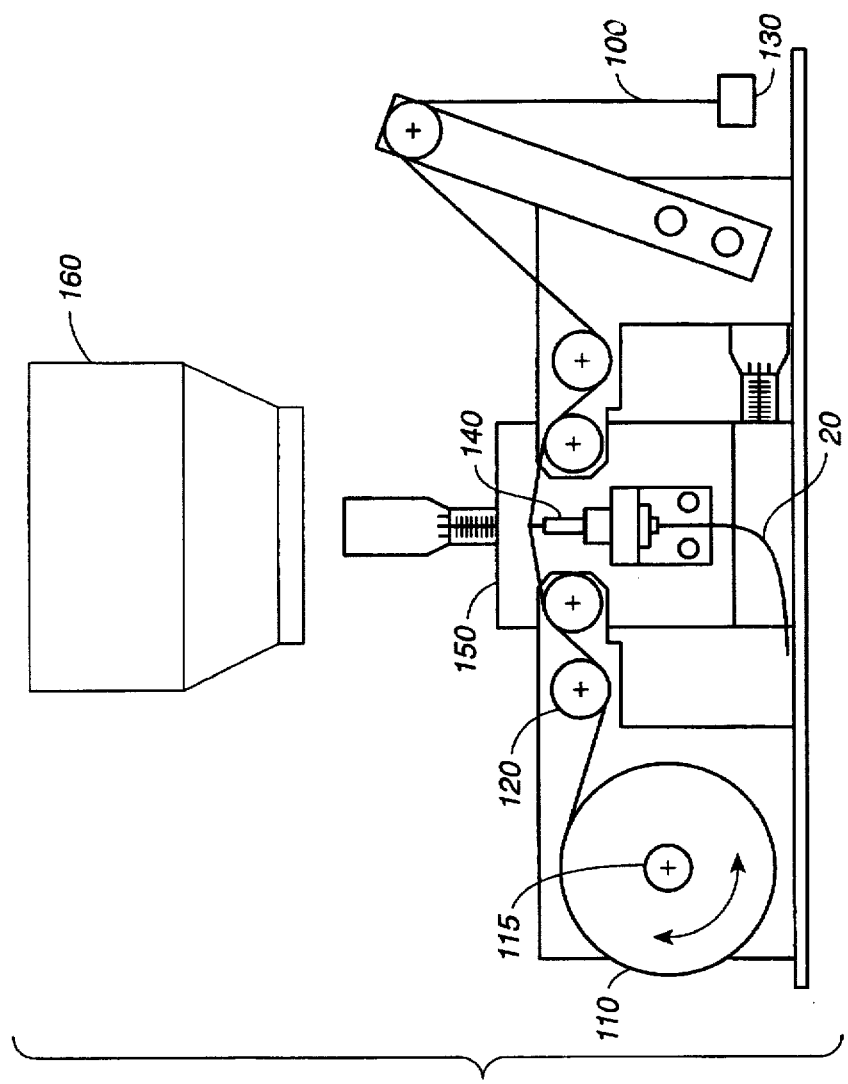
FIG._3
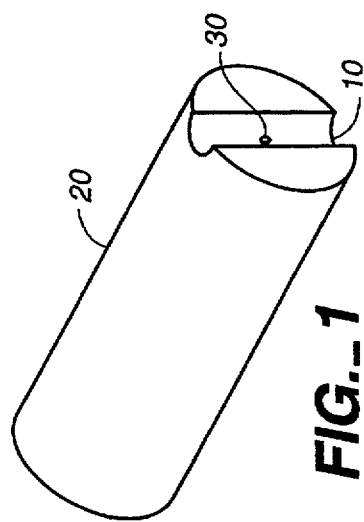
FIG._1

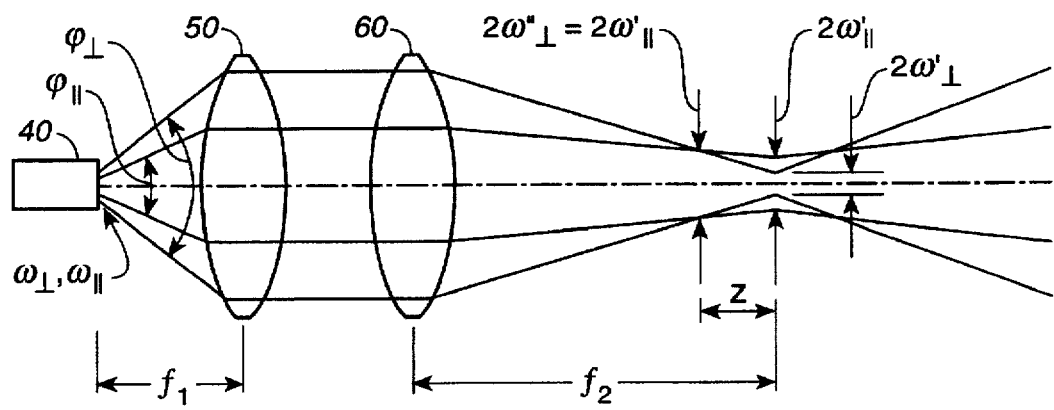
FIG._2A
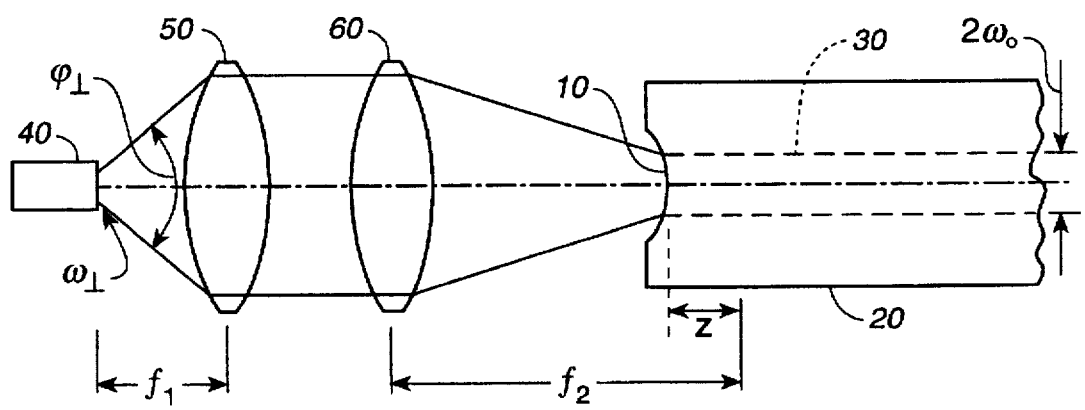
FIG._2B

METHOD FOR IMPROVING THE COUPLING EFFICIENCY OF ELLIPTICAL LIGHT BEAMS INTO OPTICAL WAVEGUIDES

FIELD OF THE INVENTION

The present invention relates to improving the coupling efficiency of elliptical light beams to circular optical waveguides and specifically to an optical coupling system comprising a concave cylindrical microlens on the end facet of an optical fiber in conjunction with bulk optic lenses, and to a method of fabrication of the concave cylindrical microlens.

BACKGROUND OF THE INVENTION

Efficient coupling between a laser diode source and an optical fiber is essential for optimal performance in optical communication, laser surgery and fiber optic sensing devices. Two techniques to launch the light from semiconductor diode lasers into optical fiber have been documented extensively in the literature: butt coupling, in which the optical fiber is brought in direct physical contact with the laser diode, and lensing, in which one or more lenses are used to collimate and focus the laser light into the fiber. Because the core diameter of a single-mode fiber is small (5–10 μmn) and the numerical aperture is low (typ. 0.14), and the laser diode has a large beam divergence angle (30°) perpendicular to the junction plane, a high coupling efficiency between laser and fibre cannot be obtained by a butt joint. Further, the alignment tolerance of the laser relative to the fibre axis is as small as 1 μm in this configuration and difficult to control in a production environment.

Lensing systems provide significantly improved coupling as the beam parameters of the laser diode may be modified to better match those of the optical fibre. In a production environment, stable coupling efficiencies of 65% are typical for an optimized pair of high quality bulk optic aspheric lenses. The main cause for the 2 dB loss in coupling is due to the mismatch in modal profiles between the elliptical beam of the laser diode and the symmetrical circular profile of the optical fibre. To address this issue a third, cylindrical lens is often introduced between the two aspheres. The increase in alignment complexity and mechanical tolerancing associated with this solution, however, prove to be uneconomical. A lens system design which corrects the modal mismatch between an elliptical light beam and the circular waveguide structure of an optical fibre is required if substantial improvements in coupling efficiency from single lateral mode diode lasers into single-mode fibres is to be realised.

SUMMARY OF THE INVENTION

The present invention significantly improves the coupling efficiency of lensed systems for elliptical light beams into circular waveguides. The preferred embodiment of the invention relates to the coupling efficiency between laser diodes and optical fibre but the principles thereof are equally applicable to any elliptical beam and circular waveguide. In the preferred embodiment, a pair of bulk optic, rotationally symmetric, asphere lenses is supplemented by a third, concave, cylindrical microlens fabricated on the end facet of the optical fibre. The microlens is designed to correct the more highly divergent, or fast axis of the elliptical beam typically emitted by laser diodes. The difference in the divergence angle of the diode laser beam perpendicular ($\theta_\perp$) and parallel ($\theta_\parallel$) to the junction plane is known as the aspect ratio of the beam and it is this ratio which dictates the optimum radius of curvature of the microlens. The purpose of the cylindrical microlens is circularise the focussed beam. The microlens collimates the fast axis of the laser beam at the point in the focal plane of the focussing asphere where the beam diameters of the fast ($\theta_\perp$) and slow ($\theta_\parallel$) axes are matched. In effect, the elliptical beam is circularised upon entry into the optical fibre. The mode profiles of the light beam and the fibre waveguide are much better matched as a result, and the coupling efficiency into the optical fibre is substantially improved.

More particularly, the invention is an optical coupling system comprising a light source, a lens system and a circularly symmetric optical waveguide which has an end facet. The light source emits a substantially elliptical beam having a major and a minor axes. The light beam is more highly divergent in a first plane perpendicular to the major axis than in a second plane parallel to the major axis. The lens system comprises at least one rotationally symmetric bulk optic lens. A concave cylindrical microlens is fabricated on the end facet of the waveguide.

In another aspect, the invention is an optical coupling system as described in the previous paragraph wherein the elliptical light source is a laser diode emitting in a single elliptical spatial mode. The lens system comprises two rotationally symmetric bulk optic asphere lenses. The concave cylindrical microlens has a spherical radius of curvature and the waveguide is an optical fibre which is single mode at the emission wavelength of the laser diode.

The method of fabricating the concave cylindrical microlens according to the invention comprises moving a fine wire in contact with and relative to the end facet, whereby friction between the wire and the end facet creates a concave, cylindrical groove in said end facet.

DESCRIPTION OF DRAWINGS

The invention will be more fully appreciated by reference to the following detailed description and to the accompanying drawings, in which:

FIG. 1 is a perspective view of a preferred embodiment of the cylindrical microlens according to the invention;

FIG. 2A is an optical ray traced diagram for a laser diode emitting through a pair of bulk optic rotationally symmetric lenses;

FIG. 2B illustrates the layout of a laser diode, a pair of bulk optic lenses and an optical fibre including a cylindrical microlens and the effect of the microlens on the optical rays coupled into the fibre; and, FIG. 3 is a side view of apparatus for fabricating a concave cylindrical microlens according to the invention.

DETAILED DESCRIPTION

A preferred embodiment of the optical fibre used in the invention is depicted in FIG. 1 wherein a concave, cylindrical microlens 10 is polished directly into the end facet of an optical fibre 20. The microlens is centered about the core 30 of the fibre. The optical fibre 20 is provided as part of an optical coupling system or assembly which also includes a laser diode 40 and two asphere rotationally symmetric bulk optic lenses 50 and 60, illustrated in FIG. 2b.

The optimum radius of curvature of the cylindrical lens is dictated by the aspect ratio of the elliptical light beam such as, for example, the beam emitted by a laser diode 40 (illustrated in FIG. 2a), as well as discussed below. The theoretical derivation of the coupling efficiency which follows is based upon a single-frequency laser diode emitting in an elliptical single spatial mode and exhibiting very little astigmatism. The optical waveguide is that of a standard telcom fibre with a step-index profile. Losses due to Fresnel reflection and angular or transversal misalignment of any of the components are neglected.

The laser beam emitted from the facet of the diode 40 is substantially elliptical with a major axis and a minor axis. The beam has a Gaussian intensity profile with spot sizes $\omega_{\parallel}$ and $\omega_{\perp}$, parallel and perpendicular to the junction plane, respectively, as shown in FIG. 2a. These spot sizes are the beam waist radii ($1/e^2$) and $\omega_{\parallel} \neq \omega_{\perp}$. The ratio $\omega_{\parallel}/\omega_{\perp}$ is known as the aspect ratio and typically ranges from 1.2:1 to 10:1 for state of the art laser diodes. The elliptical beam emitted by the laser diode is more highly divergent in the plane perpendicular to the major axis of the ellipse (i.e., the "fast" axis) than in the plane parallel to the major axis (the "slow" axis).

A pair of rotationally symmetric bulk optic lenses with focal lengths $f_1$ and $f_2$, collimate (50) and then focus (60) the laser beam at some point z with transformed spot sizes $\omega_{\parallel}'$ and $\omega_{\perp}'$ and $\omega_{\parallel}' \neq \omega_{\perp}'$. The ray traces and beam waists of both the slow and fast axes of the laser diode, $\omega_{\parallel}$ and $\omega_{\perp}$ respectively, are superimposed in the plane of the page in FIG. 2a and depicted in exaggerated scale for clarity. In FIG. 2b the effect of the concave cylindrical microlens is illustrated, wherein the fast axis of the laser beam is incident upon the microlens at an axial distance z from the focal plane of the second bulk optic asphere lens. At this position z the beam diameter of the fast axis, $2\omega_{\perp}''$ and the beam diameter of the slow axis, $2\omega_{\parallel}'$, match the mode diameter of the optical fibre, $2\omega_0$.

The laser beam is coupled into a step-index optical fibre, defined as single-mode at the laser wavelength. The power distribution in a step-index single-mode fibre can be approximated by a Gaussian beam if the normalised frequency V of the fibre is in the range $1.9 \leq V \leq 2.4$ where V is given by $$V = \frac{2\pi a}{\lambda} \sqrt{n_1^2 - n_2^2} \qquad (1)$$

where $\lambda$ is the wavelength of the optical power, $n_1$ and $n_2$ are the indices of the core and cladding, respectively, and a is the radius of the fibre core. The fibre mode radius $\omega_0$ of such a fibre is given by $$\omega_0 = a \left( 0.65 + \frac{1.619}{V^{3/2}} + \frac{2.879}{V^6} \right) \qquad (2)$$

If we position the fibre at the waist of the focussed laser beam, then the power coupling efficiency $\eta$ between the elliptical laser beam and the fundamental mode of the optical fibre is $$\eta = \eta_\parallel \eta_\perp \qquad (3)$$

where $$\eta_\parallel = \frac{2\omega_\parallel' \omega_0}{(\omega_\parallel'^2 + \omega_0^2)} \qquad (4)$$

The same formula holds for $\eta_\perp$, if the subscript '$\parallel$' is replaced by '$\perp$' in the last equation. The coupling efficiency depends upon the degree of overlap between the waist radii of the focussed laser beam and the fibre mode. To maximize $\eta$, we match the focussed beam waist of the slow axis to the fibre mode, $\omega_\parallel' = \omega_0$, by choosing an appropriate pair of lenses and then create a nonsymmetric transformation upon the fast axis, $\omega_\perp'$, such that $\omega_\perp'' = \omega_\parallel' = \omega_0$. This is achieved with the cylindrical microlens. The radius of curvature of the cylindrical microlens is chosen to null the wavefront curvature of the beam at the point where $\omega_\perp'' = \omega_0$.

The propagation of the focussed gaussian laser beam is described by $$\omega''_\perp(z)^2 = \omega_\perp'^2 \left[ 1 + \left( \frac{\lambda z}{\pi \omega_\perp'^2} \right)^2 \right] \qquad (5)$$

To optimise the coupling efficiency the mode fields must match, and so we impose the constraint that $\omega_\perp'' = \omega_0$ and solve for z. R(z), the radius of curvature of the beam wavefront at this point can then be calculated from $$R(z) = z \left[ 1 + \left( \frac{\pi \omega_\perp'^2}{\lambda z} \right)^2 \right]. \qquad (6)$$

If the focal length of the microlens is exactly matched, but opposite in sign, to the curvature of the optical beam, the curvature of the beam wavefront is nulled and thus matched to the wavefront of the fibre mode, which is planar, by definition, at the end facet of the fibre.

Classically, for a spherical lens, the radius of curvature and the focal length are related by $$f = \frac{R_L}{n-1} \qquad (7)$$

where $R_L$ is the radius of curvature of the microlens and n is the refractive index of the lens material. Optimum coupling will occur when the centre of curvature of the wavefront lies at the focal point of the lens, and we can thus calculate the optimum radius of curvature for the microlens. The optimum radius of curvature of the microlens is therefore given by:

$$R_L = (n-1) z \left[ 1 + \left( \frac{\pi \omega_\perp'^2}{\lambda z} \right)^2 \right] \qquad (8)$$

Effective radii of curvature of the microlens according to the invention are between 5 and 50 µm.

This method of improving the coupling efficiency is applicable to any fibre optic devices which require high coupling efficiency of an elliptical laser beam into optical fibre such as fibre lasers and fibre amplifiers. As an example, light from a 150 mW, single spatial mode diode laser was launched into standard telcom fibre, single mode at the laser wavelength. The aspect ratio of the emitting region of the laser diode was 2.2:1, and the radius of curvature of the microlens was 9 µm. 130 mW of light was captured by the fibre for a coupling efficiency of 87% (ex-facet). This constituted an increase in coupling of 20% relative to a traditional lensing system in which no correction for beam elipticity was provided.

Method of Fabrication

In the preferred embodiment, the cylindrical concave 10 microlens is polished directly into the polished or cleaved end facet of the optical fibre 20. The microlens is created by polishing the fibre facet with an extremely fine, high tensile strength wire which may vary in diameter from 10 µm to 100 µm with the apparatus illustrated schematically in FIG. 3. In the preferred method of fabrication, the optical fibre 20 is fixed in a ceramic ferrule 140 such that the facet to be polished extends beyond the ferrule by approximately 500 µm. The ferrule is then mounted on a precision 3-axis translator 150. The wire 100 is spooled onto a drum 110 which is mounted onto a precision spindle 115. The wire is drawn through a series of guide pins 120 into which microgrooves have been machined to eliminate lateral motion of the wire during the polishing sequence. Tension is applied to the wire by fixing a free hanging weight 130 to one end of the wire; this ensures a positive, loaded contact through the grooves on the guide pins.

The core of the fibre is carefully centered with respect to the wire (±2 µm tolerance). This alignment is verified visually with the aid of a stereoscope 160. As the wire is dragged across the end facet of the fibre, a cylindrical groove is created in the fibre with a radius of curvature equal to that of the wire. This cylindrical, spherical groove acts as a cylindrical microlens with a focal length equal to the diameter of the wire.

In an exemplary embodiment, a hard temper tungsten wire with a diameter of 50 µm was spooled onto a 2 cm drum on a precision spindle, aligned in the grooves on the guide pins, and tensioned with a 20-gram mass. A bi-directional translation of the wire parallel to its longitudinal axis, of 10 cm, repeated 75 times, produced a cylindrical groove in the end facet of the optical fibre (Corning 1060), typically 20–30 µm in width and 3–5 µm in depth. The translation of the wire is not limited to this translation sequence and those knowledgeable in the art will appreciate that any relative motion between the wire and the fibre, such as for example, bi-directional, axial, sonic, or spinning, or a combination thereof, which creates a concave cylindrical groove in the end facet of the fibre is within the spirit of the invention.

The translation of the wire may be automated. Polishing compounds may be used during the polishing sequence. The optical quality of the surface finish of the polished cylindrical microlens may be improved by flash heating the fibre end facet in the arc of an optical fusion splicer. The end facet of the fibre may be anti-reflection (AR) coated.

The concave cylindrical microlens may also be created in other ways. One method is to stamp or emboss the end facet of the fibre with a tool in which a convex ridge with an appropriate radius of curvature has been machined. The fibre tip is then heated to just below the softening temperature of silica and the embossing tool is heated to a temperature approximately 100°–200° C. above this. Another method may involve preferential chemical etching of the fibre end facet in a pattern outlined by a mask. Yet another method may involve melting the fibre end facet with an extremely hot wire of the appropriate diameter.

What is claimed is:

1. An optical coupling system comprising:
   a light source;
   a lens system;
   a circularly symmetric optical waveguide having an input end facet,
   said light source emits a substantially elliptical beam having a major axis and a minor axis and which is more highly divergent in a first plane perpendicular to said major axis than in a second plane parallel to said major axis;
   said lens system having at least one rotationally symmetric bulk optic lens; and
   a concave-shaped cylindrical microlens formed transversely across and in said end facet.

2. The optical coupling system of claim 1 wherein said waveguide is an optical fibre.

3. The optical coupling system of claim 1 wherein said light source is a laser diode.

4. The optical system of claim 1 wherein said microlens has a radius of curvature given substantially by $$R_L = (n-1)z\left[1 + \left(\frac{\pi \omega'_\perp{}^2}{\lambda z}\right)^2\right] \quad (9)$$

where $\lambda$ is the wavelength of the optical power being coupled into the waveguide, n is the index of refraction of the lens material, $\omega_\perp'$ is the beam radius in the direction of said first plane, at the focal plane of said lens system, and z is the position along the optical axis of said lens system at which the beam diameters in both said first and second planes are equal to one another and are both equal to the mode diameter of said waveguide.

5. The optical coupling system of claim 1 wherein:
   said light source is a laser diode emitting in a single elliptical spatial mode;
   said lens system comprises two rotationally symmetric bulk optic asphere lenses;
   said concave cylindrical microlens has a spherical radius of curvature; and,
   said waveguide is an optical fibre which is single mode at the emission wavelength of the laser diode.

6. A method of fabricating a concave cylindrical microlens on an end facet of an optical waveguide comprising the step of moving a fine wire in contact with and transversely across the end facet so that frictional engagement between the wire and the end facet creates a concave, cylindrical like groove in said end facet forming the microlens.

7. The method of fabrication of claim 6 comprising the step of moving the wire bidirectionally and in alignment with the longitudinal axis of the wire.

8. The method of fabrication of claim 6 wherein the formed groove comprises a concave cylindrical microlens with a focal length given by $$f = \frac{R_L}{n-1}$$

where $R_L$ is the radius of curvature of the microlens and n is the index of refraction of the waveguide.

9. The method of claim 6 wherein the optical waveguide comprises a single-mode optical fibre.

10. An optical fibre having an end facet, a concave cylindrical like microlens formed transversely across and in said end facet.

11. The optical waveguide of claim 10 wherein a radius of curvature of said cylindrical microlens is in the range of about 5 µm to about 50 µm.

12. The optical waveguide of claim 10 wherein said waveguide comprises an optical fibre having a core, said cylindrical microlens is concaved and substantially centered relative to said core.

13. The optical waveguide of claim 10 further comprising a laser beam provided as input into said end facet, a radius of curvature of said cylindrical microlens chosen to null the wavefront curvature of the laser beam at a beam position where orthogonal transverse axes of said laser beam substantially match.

14. The optical waveguide of claim 13 wherein said radius of curvature is dictated by an aspect ratio of said laser beam.

15. The optical waveguide of claim 14 wherein said aspect ratio is in the range of about 1.2:1 to about 10:1 and the radius of curvature is in the range of about 5 µm to about 50 µm.

16. The optical waveguide of claim 13 further comprising a lens system positioned along an optical axis between a source for said laser beam and said microlens, said microlens having a radius of curvature given substantially by $$R_L = (n-1)z \left[ 1 + \left( \frac{\pi \omega'_\perp{}^2}{\lambda z} \right)^2 \right]$$

where $\lambda$ is the wavelength of the laser beam, n is the refractive index of the lens system, $\omega'_\perp$ is the beam radius in a first orthogonal transverse direction at the focal plane of said lens system and z is a position along the optical axis where beam diameter of said laser beam in both the first and in a second orthogonal transverse direction are substantially equal to one another.

17. The optical waveguide of claim 16 wherein said source comprises a semiconductor laser diode.

18. The optical waveguide of claim 16 wherein said lens system comprises at least one spherical lens.

19. The optical waveguide of claim 18 wherein said lens system comprises a spherical lens to collimate said beam and a spherical lens to focus said beam to said optical fibre end facet.

20. The optical waveguide of claim 10 wherein said waveguide is an optical fibre.

21. The optical waveguide of claim 20 wherein said optical fibre is a single mode fibre or a multimode fibre.

22. The optical waveguide of claim 10 wherein said laser beam is from a semiconductor laser diode.

23. The optical waveguide of claim 21 wherein said laser is a single mode or multimode laser diode.

24. An optical waveguide having an end facet for receiving input light, a concave lens formed in said facet end.

25. The optical waveguide of claim 24 wherein said lens is a concave cylindrical lens.

26. The optical waveguide of claim 25 wherein a radius of curvature of said cylindrical lens is in the range of about 5 μm to about 50 μm.

27. The optical waveguide of claim 25 wherein said waveguide comprises an optical fibre having a core, said cylindrical lens is concaved and substantially centered relative to said core.

28. The optical waveguide of claim 24 further comprising a laser beam providing said input light into said end facet, a radius of curvature of said cylindrical lens chosen to null the wavefront curvature of the laser beam at a beam position where orthogonal transverse axes of said laser beam substantially match.

29. The optical waveguide of claim 28 wherein said radius of curvature is dictated by an aspect ratio of said laser beam.

30. The optical waveguide of claim 29 wherein said aspect ratio is in the range of about 1.2:1 to about 10:1 and the radius of curvature is in the range of about 5 μm to about 50 μm.

31. The optical waveguide of claim 25 further comprising a lens system positioned along an optical axis between a source for said laser beam and said lens, said lens having a radius of curvature given substantially by $$R_L = (n-1)z \left[ 1 + \left( \frac{\pi \omega'_\perp{}^2}{\lambda z} \right)^2 \right]$$

where $\lambda$ is the wavelength of the laser beam, n is the refractive index of the lens system, $\omega'_\perp$ is the beam radius in a first orthogonal transverse direction at the focal plane of said lens system and z is a position along the optical axis where beam diameter of said laser beam in both the first and in a second orthogonal transverse direction are substantially equal to one another.

32. The optical waveguide of claim 31 wherein said source comprises a semiconductor laser diode.

33. The optical waveguide of claim 31 wherein said lens system comprises at least one spherical lens.

34. The optical waveguide of claim 33 wherein said lens system comprises a spherical lens to collimate said beam and a spherical lens to focus said beam to said optical fibre end facet.

35. The optical waveguide of claim 24 wherein said waveguide is an optical fibre.

36. The optical waveguide of claim 35 wherein said optical fibre is a single mode fibre or a multimode fibre.

37. The optical waveguide of claim 24 wherein said light input is a laser beam is from a semiconductor laser diode.

38. The optical waveguide of claim 37 wherein said laser is a single mode or multimode laser diode.

39. An optical coupling system for increasing the coupling efficiency between a semiconductor laser source emitting a laser beam and an optical waveguide having an end facet both positioned along a common optical path so that the waveguide end facet receives the laser beam as an input, comprising:

a lens formed on the end facet of said waveguide;

said facet lens positioned in said optical path where the orthogonal transverse axes of the laser beam are substantially the same.

40. The optical coupling system of claim 39 wherein said facet lens is concaved and its radius of curvature is determined by an aspect ratio of the laser beam.

41. The optical coupling system of claim 39 further comprising a lens system positioned along an optical axis between a source for said laser beam and said lens, said lens having a radius of curvature given substantially by $$R_L = (n-1)z \left[ 1 + \left( \frac{\pi \omega'_\perp{}^2}{\lambda z} \right)^2 \right]$$

where $\lambda$ is the wavelength of the laser beam, n is the refractive index of the lens system, $\omega'_\perp$ is the beam radius in a first orthogonal transverse direction at the focal plane of said lens system and z is a position along the optical axis where beam diameter of said laser beam in both the first and in a second orthogonal transverse direction are substantially equal to one another.

42. The optical coupling system of claim 39 wherein said facet lens is a cylindrical lens.

43. The optical coupling system of claim 42 wherein said cylindrical lens is a concave-shaped lens in said end facet.

44. The optical coupling system of claim 39 wherein said waveguide is an optical fibre.

45. The optical coupling system of claim 44 wherein said optical fibre is a single mode fibre or a multimode fibre.

46. The optical coupling system of claim 39 wherein said laser beam is from a semiconductor laser diode.

47. The optical coupling system of claim 46 wherein said laser diode is a single mode or multimode laser diode.

48. A method of increasing the coupling efficiency between a semiconductor laser source emitting a laser beam and an optical waveguide both positioned along a common optical path so that the waveguide receives the laser beam as an input, comprising the steps of:

forming a lens on an end facet of the waveguide;

providing a lens system between the laser source and the waveguide end facet for collimating and focusing the laser beam; and positioning the facet lens in the optical path where the orthogonal transverse axes of the laser beam are substantially the same.

49. The method of claim 48 wherein the lens is concaved and its radius of curvature is determined by an aspect ratio of the laser beam.

50. The method of claim 48 comprising the further step of:
determining the radius of curvature by the formula of:

$$R_L = (n-1)z \left[ 1 + \left( \frac{\pi \omega'^2_\perp}{\lambda z} \right)^2 \right]$$

where $\lambda$ is the wavelength of the laser beam, n is the refractive index of the lens system, $\omega'_\perp$ is the beam radius in a first orthogonal transverse direction at the focal plane of said lens system and z is a position along the optical axis where beam diameter of said laser beam in both the first and in a second orthogonal transverse direction are substantially equal to one another.

51. The method of claim 48 wherein said facet lens is a cylindrical lens.

52. The method of claim 51 wherein said cylindrical lens is a concave-shaped lens in said end facet.

53. The method of claim 48 wherein said waveguide is an optical fibre.

54. The method of claim 53 wherein said optical fibre is a single mode fibre or a multimode fibre.

55. The method of claim 48 wherein said laser beam is from a semiconductor laser diode.

56. The method of claim 55 wherein said laser diode is a single mode or multimode laser diode.

* * * * *